Patented Aug. 7, 1945

2,381,088

UNITED STATES PATENT OFFICE 2,381,088

VISCOUS SOLUTIONS OF VEGETABLE GLOBULINS

Robin Hamilton Kendall Thomson, Kilwinning, Scotland, assignor to Imperial Chemical Industries Limited, a corporation of Great Britain No Drawing. Application December 10, 1942, Serial No. 468,578. In Great Britain October 22, 1941

5 Claims. (Cl. 18—48)

The present invention relates to viscous solutions of vegetable globulins made by dissolving the globulin in dilute aqueous solutions of strong bases, and has for an object the protection of such solutions by preventing or delaying the surface gelation which they undergo on storage.

Viscous solutions made by dissolving vegetable globulins, such as peanut globulin, in dilute aqueous solutions of caustic alkali and similar highly ionised bases are used mainly for the production of shaped protein materials, for instance filaments and films, for which purpose the globulin solutions are treated with coagulating agents, but they may also be used for other purposes or in other ways, for instance as adhesives and in the production of plastics. In the preparation of viscous solutions of vegetable globulin in aqueous solutions of strong bases for industrial purposes it is found necessary in practise to dissolve the protein in a solution of the base having a concentration that may vary only within very narrow limits depending on the source and individuality of the globulin and the globulin concentration required.

It is usually necessary to store the solution until it has acquired suitable physical characteristics. Physical and chemical changes commence to take place whenever the solution is made up. These are usually evidenced by a rise or fall in viscosity and by a very slight evolution of ammonia. If the solution is stored too long, it ultimately loses its desirable properties for certain uses. When the solution is made up with a suitable concentration of the base, however, there is always a period of practicable duration during which it is usable. Nevertheless, during this period of useful life a surface gelation frequently causes wastage of the protein solution and occasions other inconveniences, for instance by interfering with the continuity of such operations as the extrusion of a batch of the viscous alkaline vegetable globulin solutions from a containing vessel through a narrow orifice, or by adversely affecting the quality of the product coagulated from the extruded solution. The surface gelation begins at the interface where the liquid is exposed to the atmosphere, and gradually spreads into the body of the solution; it is most severe at the interface. The gelation may commence very soon after the solution has been prepared.

No method for preventing or delaying surface gelation of vegetable globulin solutions in dilute aqueous solutions of strong bases has hitherto been described, and it is an object of the present invention to prevent or delay such surface gelation, whereby wastage of the solution and inconvenience in using it may be minimised, or its useful life may be prolonged.

The remarkable discovery has now been made that the surface gelation of a viscous solution of a vegetable globulin in a dilute aqueous solution of a strong base may be prevented or delayed by maintaining in the atmosphere over the surface of the solution a partial pressure of ammonia, substantially in excess of that occasioned by the incipient hydrolysis of the protein by the strong base in the solution.

According to the present invention, therefore, a partial pressure of ammonia substantially in excess of that occasioned by the incipient hydrolysis of the protein by the strong base in the solution is maintained in the atmosphere over the surface of a viscous solution of a vegetable globulin in a dilute aqueous solution of a strong base.

According to a preferred feature of the invention, the surface of the viscous globulin solution is rendered free from air bubbles before the ammonia is introduced.

When gaseous ammonia is introduced into the free space over a viscous solution of a vegetable globulin in a dilute aqueous solution of a strong base, ammonia is absorbed into the solution with evolution of heat, but we have found it desirable by continued or intermittent admission of ammonia to maintain a substantial ammonia partial pressure over the solution for at least a considerable number of minutes, and thereafter to close off the containing vessel so that the ammonia will not escape. The ammonia pressure in the atmosphere thereafter falls away owing to its continued absorption, but even after storage when the ammonia partial pressure has fallen to a low value the solution should still smell much more strongly of ammonia than a similar solution which has never been treated with ammonia. If the ammonia treatment has been sufficient the solution will remain entirely free from surface gelation as long as any portion thereof retains its useful properties.

The maintenance of an excessive ammonia pressure is, however, harmful, since it brings about a gelation of the solution below the surface, which may culminate in an obvious syneresis. The commencement of this condition is marked by a noticeable diminution in the viscosity of the solution immediately below its free surface, but in the early stages the further undesirable progress towards syneresis can easily be arrested by exposing the solution to pressure conditions favouring evaporation of ammonia.

Since the minimum and maximum ammonia pressures will depend upon the time for which the pressure is maintained, the concentrations of the globulin and the strong base, the identity of the globulin, and the relative dimensions of the containing vessel and the alkaline globulin solution, it is quite impossible to indicate any numerical limits for them.

The invention is illustrated by the following example in which the parts are parts by weight, except where otherwise indicated.

Example

An aqueous solution containing 26 parts peanut protein and 1.5 parts sodium hydroxide per 100 parts water is prepared and deaerated. 600 ccs. of this solution are placed in a closed cylindrical vessel having a capacity of 1100 ccs. and an internal diameter of 9 cms. provided with a pipe leading into the air space near the top communicating through a screw-down valve with an ammonia cylinder. At the bottom of the vessel there is provided an outlet controlled by a valve leading through a metering pump to a candle filter terminating in a spinnerette. At the commencement of the ammonia treatment the space above the surface of the solution is occupied by air at atmospheric pressure. Ammonia gas is then released from the ammonia cylinder into the air space at intervals over a period of 15 minutes so as to maintain during that time an excess pressure of ammonia of approximately 7 lbs. per square inch. The ammonia valve is then closed and the vessel is allowed to remain sealed for a period of 16 hours, by which time the pressure has fallen to little more than atmospheric. The outlet valve leading to the pump and the candle filter is then opened and the viscous solution is converted into artificial filaments by coagulation in known manner as it is extruded from the spinnerette. The whole of the solution extrudes satisfactorily, and yields a satisfactory quality of filament. The pressures of ammonia and air employed for the ammonia treatment according to this example may be varied considerably. Thus, the ammonia pressure may be maintained at anything up to 20 lbs. instead of 7 lbs. per square inch. The air pressure may be above or below atmospheric instead of atmospheric.

In a parallel preparation in which the treatment with the ammonia gas is omitted, the top of the solution is found to have been converted into a firm jelly to a depth of about ½ cm. and it is thus impossible to extrude the whole of the solution originally introduced into the cylindrical vessel.

I claim:
1. In the manufacture or storage of viscous vegetable globulin solutions in dilute aqueous solutions of alkali metal hydroxide the method of preventing or delaying surface gelation which comprises maintaining in the atmosphere over the surface of the solution a partial pressure of ammonia substantially in excess of that occasioned by the incipient hydrolysis of the protein by the alkali metal hydroxide in the solution.

2. The method of treating viscous aqueous vegetable globulin solutions in a dilute aqueous solution of a alkali metal hydroxide which comprises introducing sufficient ammonia above the surface of the solution to produce a partial pressure of ammonia substantially in excess of that occasioned by the incipient hydrolysis of the protein by the alkali metal hydroxide in the solution and subsequently adding additional ammonia to maintain said partial pressure.

3. A method for treating viscous vegetable globulin solutions in dilute aqueous solution of an alkali metal hydroxide which comprises eliminating air bubbles from the surface of the said globulin solution and subsequently maintaining in the atmosphere over the surface of the solution a partial pressure of ammonia substantially in excess of that occasioned by the incipient hydrolysis of the protein by the alkali metal hydroxide in the solution.

4. In the manufacture or storage of viscous vegetable globulin solutions in dilute aqueous solutions of alkali metal hydroxide the method of preventing or delaying surface gelation which comprises maintaining in the atmosphere over the surface of the solution a partial pressure of ammonia substantially in excess of that occasioned by the incipient hydrolysis of the protein by the alkali metal hydroxide in the solution, but below that pressure of ammonia capable of causing syneresis.

5. The method of treating viscous aqueous vegetable globulin solutions in dilute aqueous solution of alkali metal hydroxides which comprises introducing sufficient ammonia above the surface of the solution to maintain a partial pressure of ammonia sufficient to prevent surface gelation of the protein in the solution.

ROBIN H. K. THOMSON.